J. W. McGHEE.

DRAPERY HOOK.

APPLICATION FILED AUG. 22, 1921.

Reissued Jan. 10, 1922. 15,263.

Inventor:
James W. McGhee
by Edmund A. Thauer
atty.

UNITED STATES PATENT OFFICE.

JAMES W. McGHEE, OF LOS ANGELES, CALIFORNIA, ASSIGNOR OF ONE-HALF TO EDWARD C. JINKS, OF LOS ANGELES, CALIFORNIA.

DRAPERY HOOK.

15,263. Specification of Reissued Letters Patent. Reissued Jan. 10, 1922.

Original No. 1,334,661, dated March 23, 1920, Serial No. 296,473, filed May 12, 1919. Application for reissue filed August 22, 1921. Serial No. 494,446.

*To all whom it may concern:*

Be it known that I, JAMES W. McGHEE, a citizen of the United States, residing at Los Angeles, in the county of Los Angeles and State of California, have invented new and useful Improvements in Drapery Hooks, of which the following is a specification.

My object is to make an improved drapery hook, and my invention consists of the novel features herein shown, described and claimed.

Figure 1:
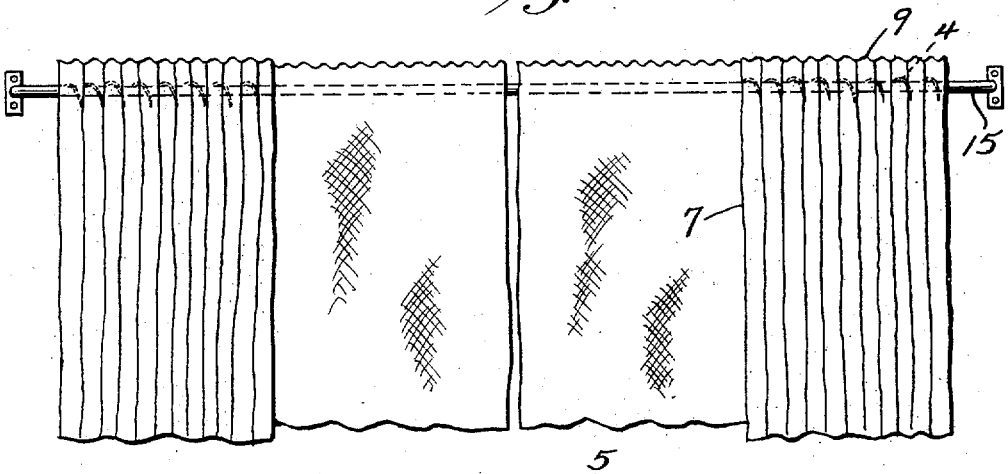
Figure 1 is a fragmentary front elevation showing a drapery supported by drapery hooks embodying the principles of my invention.
Figure 4:
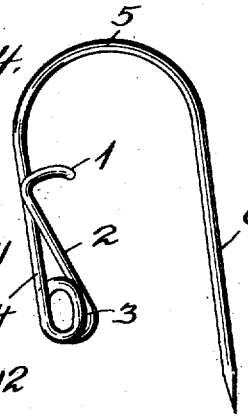
Fig. 4 is a perspective of the drapery hook removed from the drapery.
Figure 2:
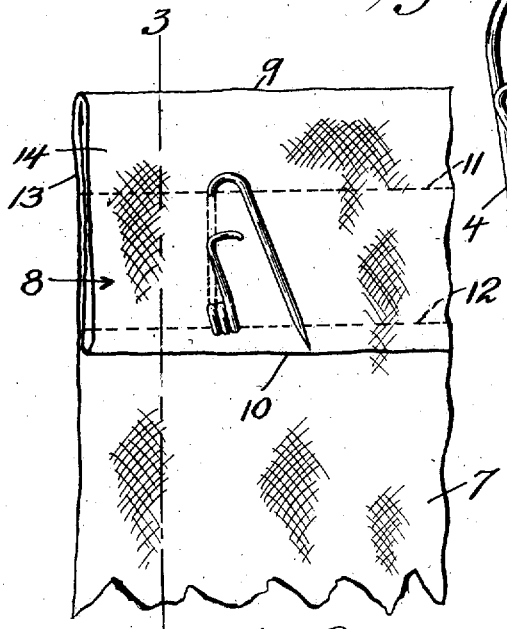
Fig. 2 is a fragmentary rear elevation of a piece of drapery with a hook applied ready for use.
Figure 3:
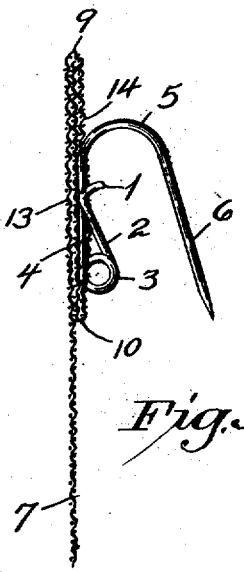
Fig. 3 is a cross sectional detail on the line 3—3 of Fig. 2.

Referring to the drawings in detail, the drapery hook is made of medium hard wire bent to form the finger 1, the arm 2 extending from one end of the finger 1, the spring coil 3 at the opposite end of the arm 2 from the finger 1, the arm 4 extending from the opposite end of the coil 3 from the arm 2, the bend 5 extending from the upper end of the arm 4, and the point 6 extending from the opposite end of the bend 5 from the arm 4.

The drapery comprises a body portion 7 of suitable fabric and the hem portion 8 formed by folding the fabric upon itself to make the folded edge 9 and folding the extreme edge of the fabric under to make the folded edge 10 and applying the lines of stitching 11 and 12.

The drapery hook is applied by inserting the point 6 through one thickness of the fabric just above the line of stitching 12 and passing the point between the front layer of fabric 13 and the rear layer of fabric 14 and out through the rear layer of fabric 14 just below the line of stitching 12, so that the rear layer of fabric 14 will pass between the arm 3 and the finger 1, and so that the finger 1 will press the fabric against the arm 4.

Several hooks are applied to a piece of drapery and then the drapery is placed in front of the curtain pole 15 and the hooks are applied by passing the point 6 downwardly over the back of the pole 15.

It should be noted that the drapery hook is not sewed on to the drapery, but is inserted and removed therefrom freely, thus dispensing entirely with any sewing.

What I claim is:

1. A drapery hook, comprising a piece of spring wire bent intermediate of its ends to form a hook, one of its sides terminating in a point to form a pin, and the other side comprising a shank, a spring coil formed at the end of the shank, an arm extending inwardly from the outer end of the coil toward the bend, the outer end of said arm being bent to form a bearing portion and adapted to rest resiliently against the shank adjacent to the coil, the arm being disposed between the shank member and the point of the pin.

2. A drapery hook, comprising a spring wire bent to form a hook, the end of one side of said hook being pointed, the other side constituting a shank, and an arm extending inwardly from the shank end of said hook and terminating adjacent the bend.

3. A drapery hook formed from a single piece of spring wire bent intermediate of its ends into a substantially U shaped form the end of one side of the hook being tapered to form a piercing point, the other side of said hook constituting a shank, the end of said shank being bent to form a spring loop, an arm extending upwardly from said loop and disposed adjacent said shank and terminating near the hook bend, the extreme end of said arm being bent at an angle thereto.

4. A drapery hook, comprising a single piece of resilient wire bent intermediate of its ends to form a hook, the end of one of its sides terminating in a point to form a pin, and the other side comprising a shank, a resilient coil formed at the end of the shank, an arm extending inwardly from the outer end of the coil towards the bend and terminating adjacent the bend, the extreme upper end of said arm being bent at an angle to said arm portion.

In testimony whereof I have signed my name to this specification.

JAMES W. McGHEE.